United States Patent
Obrist

(10) Patent No.: US 12,221,217 B2
(45) Date of Patent: Feb. 11, 2025

(54) AERIAL VEHICLE WITH HYBRID DRIVE AND ROTOR UNIT INCLUDING ROTOR SHAFTS COUPLED BY INCLINED SYNCHRO GEAR WHEELS

(71) Applicant: SWISSDRONES OPERATING AG, Buchs (CH)

(72) Inventor: Lukas Obrist, Kaiseraugst (CH)

(73) Assignee: SWISSDRONES OPERATING AG, Buchs (CH)

( * ) Notice: Subject to any disclaimer, the term of this patent is extended or adjusted under 35 U.S.C. 154(b) by 88 days.

(21) Appl. No.: 17/758,473

(22) PCT Filed: Jan. 7, 2021

(86) PCT No.: PCT/EP2021/050190
§ 371 (c)(1),
(2) Date: Jul. 7, 2022

(87) PCT Pub. No.: WO2021/140153
PCT Pub. Date: Jul. 15, 2021

(65) Prior Publication Data
US 2023/0036129 A1     Feb. 2, 2023

(30) Foreign Application Priority Data
Jan. 8, 2020    (EP) .................................... 20150757

(51) Int. Cl.
*B64C 27/605*      (2006.01)
*B64C 27/04*       (2006.01)
(Continued)

(52) U.S. Cl.
CPC .............. *B64D 27/24* (2013.01); *B64C 27/08* (2013.01); *B64C 27/32* (2013.01); *B64C 27/605* (2013.01);
(Continued)

(58) Field of Classification Search
CPC .. B64D 2027/026; B64D 27/10; B64D 27/24; B64D 35/00; B64C 27/04; B64C 27/32;
(Continued)

(56) References Cited

U.S. PATENT DOCUMENTS 2,571,662 A    10/1951   Oliver
9,004,395 B2 *   4/2015   Botti ........................ B64C 27/82
                                        244/17.11
(Continued)

FOREIGN PATENT DOCUMENTS

CN       110 203 383 A    9/2019
DE       102008014404 A1    10/2009
(Continued)

OTHER PUBLICATIONS

International Search Report and Written Opinion issued Feb. 9, 2021 in Intl. Appl. No. PCT/EP2021/050190.

*Primary Examiner* — Brady W Frazier
(74) *Attorney, Agent, or Firm* — MEDLER FERRO WOODHOUSE & MILLS PLLC

(57) ABSTRACT

An aerial vehicle is disclosed having a hybrid drive unit and a rotor unit wherein the hybrid drive unit includes at least a combustion engine, a generator and a first electric motor and the rotor unit includes a first rotor. The combustion engine is configured to drive the generator to produce electricity, and the generator is coupled to the first electric motor in such a way that the first electric motor is feedable with electricity from the generator. The rotor unit includes a second rotor and the hybrid drive unit includes a second electric motor, wherein the generator is coupled to the second electric motor in such a way that the second electric motor is feedable with electricity from the generator. The first rotor is driven by the first electric motor and the second rotor is driven by the second electric motor.

12 Claims, 4 Drawing Sheets

(51) Int. Cl.
  *B64C 27/08* (2023.01)
  *B64C 27/32* (2006.01)
  *B64D 27/02* (2006.01)
  *B64D 27/10* (2006.01)
  *B64D 27/24* (2024.01)
  *B64D 35/00* (2006.01)
  *B64U 10/13* (2023.01)
  *B64U 30/20* (2023.01)
  *B64U 50/23* (2023.01)
  *B64U 50/33* (2023.01)
  *F02C 3/00* (2006.01)
  *B64C 39/02* (2023.01)

(52) U.S. Cl.
  CPC ............. *B64D 27/10* (2013.01); *B64D 35/00* (2013.01); *B64U 10/13* (2023.01); *B64U 30/20* (2023.01); *B64U 50/23* (2023.01); *B64U 50/33* (2023.01); *F02C 3/00* (2013.01); *B64C 27/04* (2013.01); *B64C 39/024* (2013.01); *B64D 27/026* (2024.01); *F05D 2220/329* (2013.01); *F05D 2220/76* (2013.01)

(58) Field of Classification Search
  CPC ....... B64C 27/605; B64C 39/024; F02C 3/00; F05D 2220/329; F05D 2220/76
  USPC .......................................................... 244/55
  See application file for complete search history.

(56) References Cited

U.S. PATENT DOCUMENTS

| 10,343,770 | B2 | 7/2019 | Mullins | |
| 2009/0145998 | A1* | 6/2009 | Salyer | B64C 27/02 244/17.11 |
| 2012/0025032 | A1* | 2/2012 | Hopdjanian | B60L 3/0046 903/905 |
| 2013/0092789 | A1* | 4/2013 | Botti | B60L 50/15 244/54 |
| 2014/0346283 | A1* | 11/2014 | Salyer | B64C 37/00 903/903 |
| 2015/0151844 | A1* | 6/2015 | Anton | B64D 27/24 903/903 |
| 2016/0107748 | A1* | 4/2016 | Luyks | B64C 27/82 416/151 |
| 2017/0210480 | A1 | 7/2017 | Lauder et al. | |
| 2017/0253326 | A1* | 9/2017 | Mullins | B64C 27/08 |
| 2017/0297695 | A1* | 10/2017 | Schaeffer | B64C 27/46 |
| 2018/0170190 | A1* | 6/2018 | Siegel | B64D 27/24 |
| 2019/0185154 | A1 | 6/2019 | Kim | |
| 2021/0362862 | A1* | 11/2021 | Jaljal | F02C 6/20 |

FOREIGN PATENT DOCUMENTS

| EP | 3090951 A1 | 11/2016 |
| EP | 3519294 A1 | 8/2019 |
| JP | H11-147499 A | 6/1999 |
| WO | 2010123601 A1 | 10/2010 |
| WO | 2018060591 A1 | 4/2018 |

* cited by examiner

Prior Art

AERIAL VEHICLE WITH HYBRID DRIVE AND ROTOR UNIT INCLUDING ROTOR SHAFTS COUPLED BY INCLINED SYNCHRO GEAR WHEELS

TECHNICAL FIELD

The present invention relates to an aerial vehicle according to the preamble of independent claim 1.

Such aerial vehicles principally include manned and unmanned vehicles which take-off and land vertically, in particular helicopters. More specifically, the invention can relate to unmanned aerial vehicles (UAV) such as helicopter drones or the like. UAV usually comprise a take off weight of approximately up to 90 to up to 200 kg and, in professional applications for example, can be used for transporting measuring and monitoring instruments to hard-to-access areas respectively in situations in which the use of manned helicopters would be too dangerous for the crew.

PRIOR ART

Currently, the UAV market is undergoing rapid change and especially in the European market the need for highly reliable solutions becomes a necessity. The upcoming rules recently defined by EASA make a clear mark that operating UAVs in high risk environments (i.e. populated areas, gatherings of people) requires similar standards like the manned aviation. Therefore the next generation of UAVs has to be improved concerning safety, reliability and compliance on aviation standards.

In known helicopter drones conventional rotor systems are used which comprise a main rotor and a tail rotor. In these rotor systems, a certain percentage of power is used for driving the tail rotor. Here, the tail rotor is used for torque balance of the main rotor and for controlling the helicopter about the vertical axis. The power generated by the drive motor is thus only partially passed on to the main rotor which reduces the efficiency of the system such that the performance of the system is generally limited.

Furthermore, the tail rotor of a conventional helicopter always requires increased attention. On the ground, the tail rotor may cause an increased danger of injuries, e.g. due to untrained personnel. During take-off and landing, the tail rotor is particularly threatened by external damage. If the tail rotor gets damaged here, the helicopter is usually no longer controllable such that there is a danger of total failure of the helicopter.

In addition, the known aerial vehicles do regularly not comprise techniques preventing that in case of a failure of the drive the helicopter will inevitably crash. This may on the one hand cause a significant financial loss and on the other hand may pose a considerable safety problem.

From DE 10 2008 014 404 A1 however, an unmanned aerial vehicle is known which comprises a hybrid drive. There, a generator is driven by a combustion engine for generating electricity. The electricity feeds an electric motor which functions as primary drive and/or buffer batteries, wherein the electric motor may also be fed with electricity from the buffer batteries. This solution indeed provides for a redundancy for conventional drives. Yet, still a need exists for an improved design with further enhanced safety characteristics and higher efficiency.

It is therefore the object of the present invention to provide for an aerial vehicle with a more efficient rotor unit design and with additional redundancy characteristics.

SUMMARY OF THE INVENTION

This object is solved in accordance with the present invention by an aerial vehicle as defined by the features of independent claim 1. Preferred embodiments of the present invention are derived from the dependent claims.

The essence of the present invention is the following: An aerial vehicle has a hybrid drive unit and a rotor unit. The hybrid drive unit comprises at least a combustion engine, a generator and a first electric motor and the rotor unit comprises a first rotor. Thereby, the combustion engine is configured to drive the generator to produce electricity and the generator is coupled to the first electric motor in such a way that the first electric motor is feedable with electricity from the generator. Further, the rotor unit comprises a second rotor and the hybrid drive unit comprises a second electric motor. The generator is coupled to the second electric motor in such a way that the second electric motor is feedable with electricity from the generator. The first electric motor is coupled to the first rotor in order to drive the first rotor. The second electric motor is coupled to the second rotor to drive the second rotor.

The generator can be a generator in a more literal sense, e.g. as single entity. Alternatively, the generator can also be embodied by a plurality of units. For example, the generator can be a generator assembly comprising a generator unit for the first electric motor and another generator unit for the second electric motor. Similarly, also the combustion engine can be comprised of plural combustion engine units.

The term "coupled" as used in connection with the generator and the first and second electric motors relates to any connection suitable for transferring the electricity or electric energy from the generator to the electric motors. Thereby, such connection can be directly provided or embodied via other components. For coupling the generator to the electric motors cables, wires or similar elements can be used.

Similarly, the term "coupled" as used in connection with the electric motors and the rotors relates to any connection allowing to drive or rotate the rotors. In particular, such connection can be a mechanical connection allowing to transfer a movement such as a rotational movement to the rotators. Such connection can be directly or indirectly embodied.

According to the present invention, the first and the second rotor, respectively the first and the second rotor shaft are driven by two independent electric motors, i.e. the first and the second electric motor.

It is noted that in accordance with the present invention the first rotor and the second rotor are configured as main rotors, i.e. the inventive aerial vehicle is designed in such a manner that the use of a tail rotor for controlling the aerial vehicle about the vertical axis (yaw control) may be waived. Such a rotor is system is also referred to as double rotor system of which the Flettner-type rotor system may be particularly beneficial.

As combustion engine generally any kind of motor may be applied which operates with the combustion of fuel, for example a combustion motor with cylinders or also a combustion turbine, as for example a shaft power turbine. Shaft power turbines generally comprise a very smooth running and thus avoid vibrations, which could affect particularly sensitive sensors on board of the aerial vehicle. Thus, in some embodiments shaft power turbines may be advantageous.

Preferably, the hybrid drive unit further comprises at least one buffer battery which is coupled to the generator to be fed with electricity produced by the generator, and coupled to the first electric motor and/or the second electric motor to feed the first electric motor and/or the second electric motor. The buffer battery can be coupled similarly as described above in connection with the generator. This mode of operation is preferably selected when the combustion engine fails. The storage capacity of the buffer batteries typically is suitably designed such that a safe landing of the aircraft is always guaranteed. More specifically, the remaining flight time should be approximately 15 to 20 minutes, i.e. sufficiently long to safely land the aerial vehicle even if the latter is further remote from the starting point and/or in a high risk environment.

Preferably, a shaft of the first rotor and a shaft of the second rotor are coupled to one another by means of a coupling unit such as, advantageously, a gear unit. Hereby, on the one hand, the required synchronous run of the two rotors may be guaranteed and on the other hand it is ensured that one electric motor may replace the other electric motor in case of a motor failure, which represents an important extra safety feature.

Thereby, the gear unit preferably comprises a first synchro gear wheel being coupled to the shaft of the first rotor and a second synchro gear wheel being coupled to the shaft of the second rotor. Such a gear unit may be efficient and comparably simple in construction preventing a high technical complexity, i.e. a high number of part such as wheels or the like. Also, such gear unit may be comparably reliable. Thereby, the first synchro gear wheel and the second synchro gear wheel preferably engage, wherein such engagement advantageously is a direct engagement. Like this, a particularly simple, reliable and efficient gear unit can be provided.

Preferably, the first rotor and the second rotor are configured to rotate in opposite directions and to mesh in an interleaved manner. These characteristics are typical for the above-mentioned Flettner-type rotor systems which generally comprise a higher degree of efficiency than the rotor systems of conventional helicopters. Further preferred, the first rotor and the second rotor run with an angular offset of 90° to one another. In this manner, the interleaved meshing of the first and the second rotor is achieved in a particularly effective manner. The angular offset in this connection can relate to an angle when viewing onto the rotors, i.e. top down. The angular offset can be between the shafts of the two rotors.

Preferably, the first rotor and the second rotor are inclined with regard to a horizontal axis of the rotor unit in opposite directions, wherein preferably the inclination of the rotor blades with regard to the horizontal axis of the rotor unit is between 5° and 20°, further preferred between 10° and 15°. In this manner, particularly stable flying characteristics may be achieved. The rotor blades extend substantially perpendicular from the rotor shaft/rotor head such that the rotor shafts have the same inclination with regard to a vertical axis of the rotor unit.

Preferably, at least one of the two rotors is equipped with a sensor for measuring the rotor speed. For a direct sensor reading, usually magnets in/at the gear wheel are used as signal transmitters. Thus, usually a magnet sensor is arranged close to the gear wheel which records the impulses of the magnets. The control electronics evaluates the frequency and may thus exactly determine the rotor speed. In order to increase the reliability, usually two or three magnets are provided in/at the gear wheel. The value for the rotor speed determined in this manner may be output via telemetry or used for regulating the rotor speed.

Preferably, the rotor unit comprises an upper, rotating swash plate and a lower, non-rotating swash plate (which together form a swash plate unit) wherein at least one servo drive is arranged at the lower, non-rotating swash plate. Typically, three or more servo drives are arranged at the lower, non-rotating swash plate. The servo drives are usually connected to the lower, non-rotating part of the swash plate unit in such a way that tilting in all directions and moving the swash plate unit up and down are made possible. Tilting the swash plate unit enables a cyclical change in the setting angle. Raising and lowering the swash plate unit changes the angle of attack of all rotor blades in the same way and thus leads to a collective change in the angle of attack.

Preferably, the hybrid drive unit is formed as serial hybrid drive. By replacing the conventional drive train (combustion engine, gearbox, split gearbox, rotor head) by the serial hybrid drive, the first rotor and the second rotor of the inventive rotor unit can be driven by two energy sources (i.e. by the fuel of the combustion engine or the electricity of the buffer battery) and has therefore a completely independent redundancy in the primary drive in case of a failure of one of the energy sources (i.e. of the fuel as the primary energy source or of the buffer battery as the emergency energy source).

BRIEF DESCRIPTION OF THE DRAWINGS

Additional advantageous configurations of the invention arise from the subsequent description of the embodiments of the invention with the aid of the schematic drawings. In particular, the fastening element according to the invention is subsequently described in detail with reference to the included drawings with the aid of the embodiments. It shows.

WAY(S) TO IMPLEMENT THE INVENTION

Figure 1:
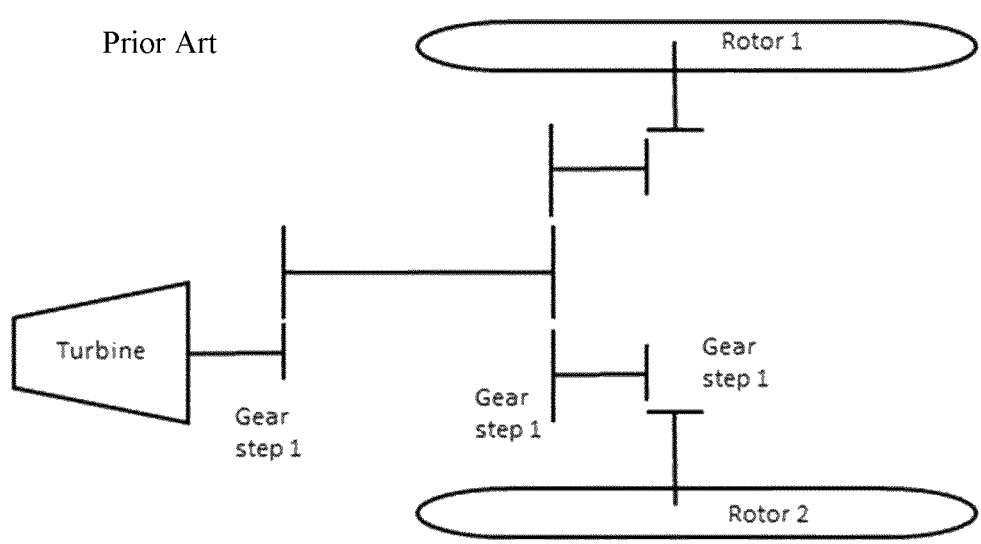
FIG. 1: a drive scheme for an aerial vehicle according to the prior art.

Certain expressions are used in the following description for practical reasons and are not to be understood as limiting. The words "right", "left", "below", and "above" indicate directions in the drawing which is being referenced. The expressions "inwardly", "outwardly", "beneath", "above", "to the left of", "to the right of", or the like are used to describe the arrangement of designated parts relative to one another, the movement of designated parts relative to one another, and the directions toward or away from the geometric center of the invention and the listed parts of the same as shown in the figures. These relative spatial directions also comprise other positions and directions than those shown in the figures. For example, if a part shown in the figures is rotated, then elements or features that were described as "below" are then "above". The terminology comprises the above, explicitly mentioned words, derivations of the same, and words of similar meaning.

In order to avoid repetitions in the figures and the associated description of the different aspects and embodiments, certain features are to be understood as common for different aspects and embodiments. The omission of one aspect in the description or in a figure does not allow for the conclusion that this aspect is lacking in the associated embodiment. Rather, such an omission may increase clarity and prevent repetitions. In this context, the following definition applies for the entire subsequent description: If reference numerals are contained in one figure for the purpose of graphic clarity; however, not mentioned in the directly associated textual description, then reference is made to the detailed explanation thereof in the preceding descriptions of the figures. If, in addition, reference numerals are mentioned in the textual description directly associated with a figure, which reference numerals are not included in the associated figure, then reference is made to the preceding and following figures. Similar reference numerals in two or more figures indicate similar or identical elements.

FIG. 1 schematically depicts a drive unit of a prior art UAV. Here, the turbine drives a gear unit which comprises eight gear wheels altogether and which may provide for a mechanical transmission from 100,000 rpm to 950 rpm. The turbine has an endurance of 2 hours with a consumption of about 15 l/h. Due to the relatively high mechanical complexity, the drive unit comprises several single points of failure.

Figure 2:
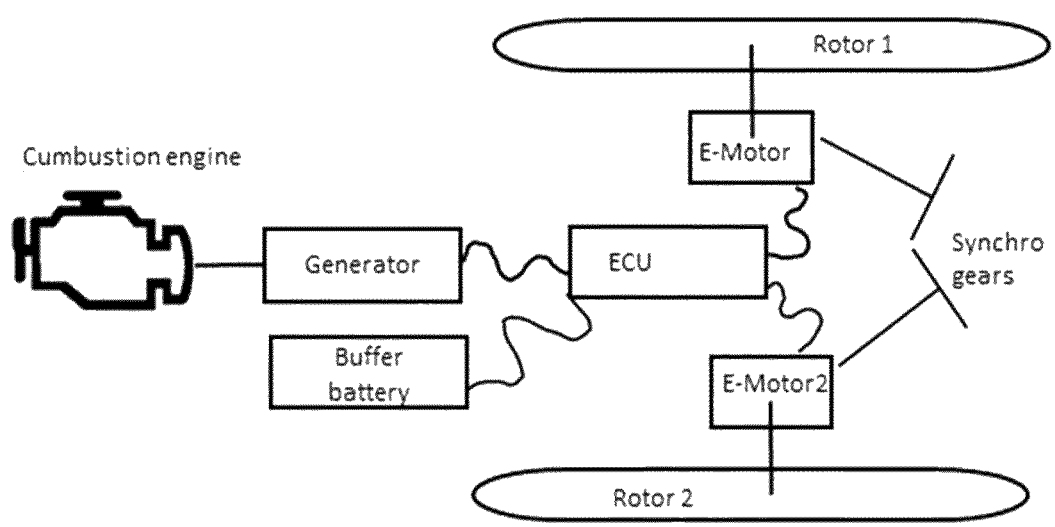
FIG. 2: a drive scheme for the inventive aerial vehicle.

Contrary to this, the inventive drive unit illustrated schematically in FIG. 2 only requires two synchro gear wheels which are just used in case one of the two electric motors fails and to keep the two rotors synchronized. The drive unit includes an electrical transmission from motor rpm to rotor rpm. The combustion engine which drives the generator may be a piston engine or a rotary engine. The drive unit further comprises a buffer battery which is charged with electricity from the generator. The buffer battery, which is also connected to the engine control unit (ECU), is designed such that in case of a motor failure a safe landing of the aerial vehicle is always guaranteed. More specifically, the remaining flight time should be approximately 15 to 20 minutes, i.e. sufficiently long to safely land the aerial vehicle even if the latter is further remote from the starting point and/or in a high risk environment. Due to the reduced mechanical complexity, the inventive drive unit comprises less single point of failures.

Figure 3:
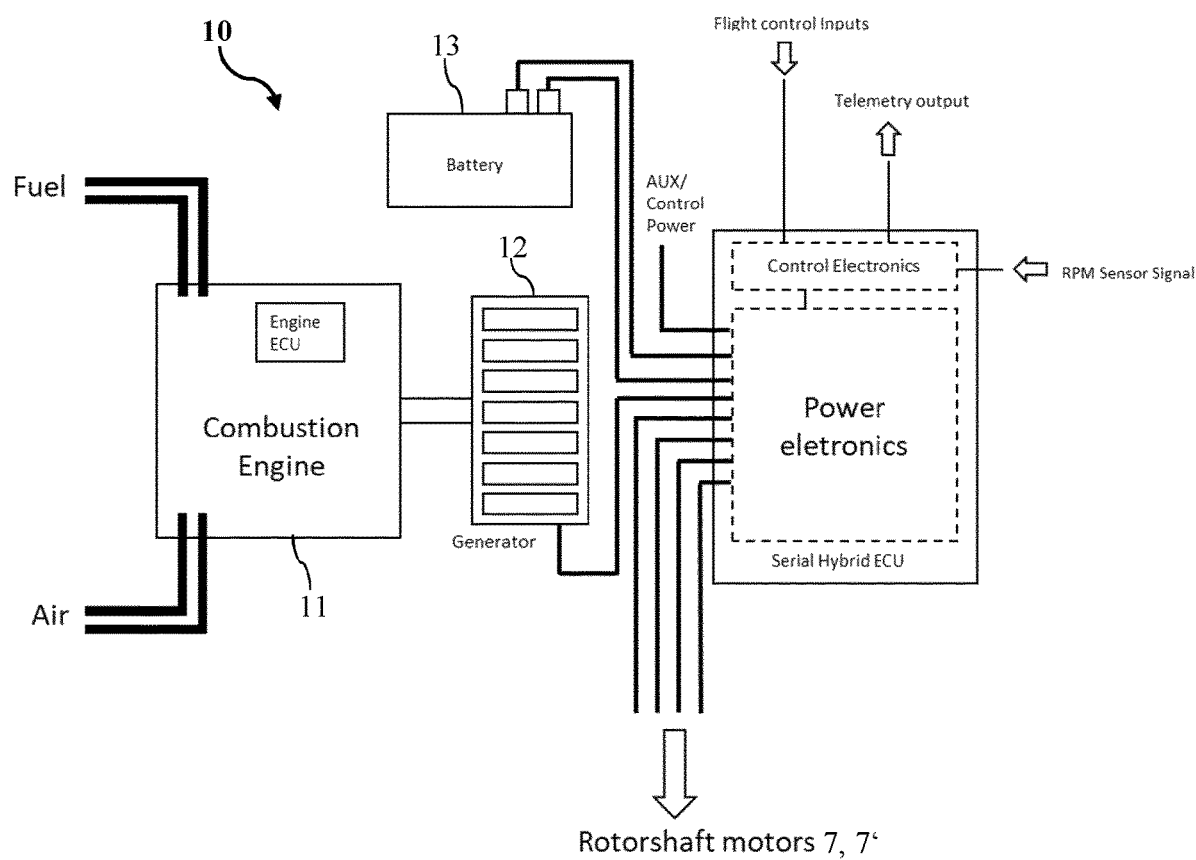
FIG. 3: a schematic representation of the inventive serial hybrid drive unit.

In FIG. 3 the power generation of the serial hybrid drive unit 10 in accordance with the present invention is shown. The combustion engine 11 operates with fuel and air and comprises an engine control unit (ECU). The combustion engine 11 drives a generator 12 which produces electricity and which is connected to a serial hybrid ECU. The serial hybrid ECU includes power electronics and control electronics. The power electronics controls the required electricity for the electric motors 7, 7' at the rotor shafts as well as for the buffer battery. The power electronics is further connected to an auxiliary control power. The control electronics receives rpm sensor signals from the rotor shafts and flight control inputs and provides for a respective telemetry output.

Figure 4:
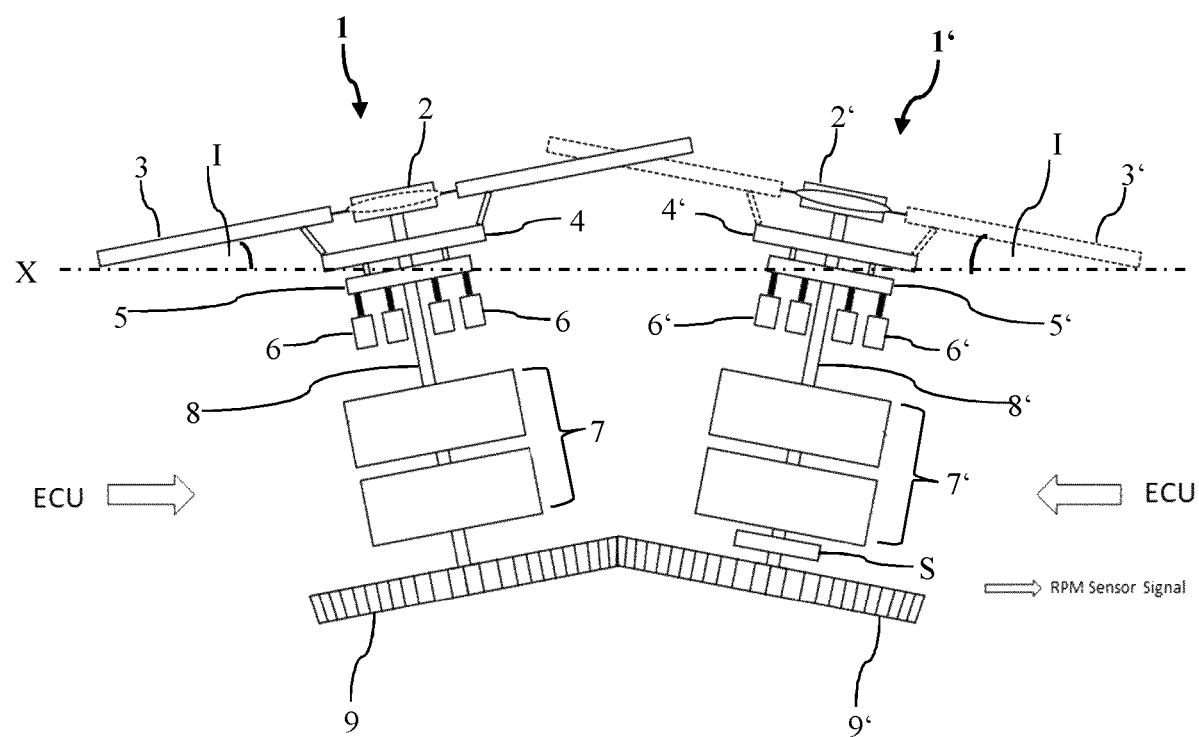
FIG. 4: a schematic representation of the inventive rotor unit with the two rotors being coupled to one another via a gear unit.

FIG. 4 shows the inventive rotor unit which comprises first rotor 1 and second rotor 1'. Each rotor 1, 1' comprises a rotor shaft 8, 8' and a rotor head 2, 2' to which two rotor blades 3, 3' are coupled, respectively. Rotor blades 3, 3' are connected to an upper, rotating swash plate 4, 4'. A lower, non-rotating swash plate 5, 5' is connected to the upper, rotating swash plate 4, 4'. The two swash plates form a swash plate unit 4, 4'; 5, 5'. At the underside of the lower, non-rotating swash plate 5, 5' four servo drives 6, 6' are arranged which shall provide for a tilting of the swash plate unit 4, 4'; 5, 5' in all directions and moving the swash plate unit up and down. Tilting the swash plate unit 4, 4'; 5, 5' enables a cyclical change in the setting angle; raising and lowering the swash plate unit changes the angle of attack of all rotor blades 3, 3' in the same way and thus leads to a collective change in the angle of attack.

Electric motors 7, 7' are provided for driving the rotor shafts 8, 8'. In this embodiment, the right rotor 1' is equipped with a sensor S for measuring the rotor speed. Sensor S generates a respective rpm sensor signal for the control electronics of the serial hybrid ECU (cf. also FIG. 3). The serial hybrid ECU controls the electricity required by electric motors 7, 7' and the buffer battery 13. Each rotor shaft 8, 8' is coupled at its lower end to a synchro gear wheel 9, 9'. The two synchro gear 9, 9' wheels act together as a gear unit as coupling unit.

The first rotor 1 and the second rotor 1' are inclined in opposite directions with regard to a horizontal axis X of the rotor unit. Specifically, the inclination I of the rotor blades 3, 3' with regard to the horizontal axis X is between 5° and 20°, preferably between 10° and 15°. Further, the first rotor 1 and the second rotor 1' are configured to rotate in opposite directions and to mesh (i.e. with their rotor blades 3, 3') in an interleaved manner. Thereby, the first rotor 1 and the second rotor 2 are preferably operated with an angular offset of 90°. The inventive rotor unit 1, 1' is a so-called Flettner-type double rotor unit.

It will be appreciated that the present invention advantageously combines a serial hybrid concept to a Flettner-type helicopter, manned or unmanned and independent of its size, since the benefits of the present invention apply for any size, if additional overall system reliability is desired. The invention adds redundancy to the entire drive train by reducing mechanical complexity at the same time.

Even though the invention is depicted and described in detail by means of the figures and the associated description, this depiction and this detailed description are to be understood as illustrative and exemplary, and not as limiting the invention. In order to not transfigure the invention, in certain cases, well-known structures and technologies may not be shown and described in detail. It is understood that persons skilled in the art may make changes and modifications without abandoning the scope of the following claims. In particular, the present invention covers additional embodiments having any combination of features that may deviate from the explicitly described combination of features.

The present disclosure also comprises embodiments with any combination of feature that are listed or shown previously or subsequently to the embodiments. It likewise comprises individual features in the figures, even if they are shown there in conjunction with other features and/or are not listed previously or subsequently. The alternatives described in the figures may be excluded from embodiments and the description and individual alternatives, whose features may be excluded from the subject matter of the invention or from the disclosed subject matter. The disclosure comprises embodiments that exclusively comprise the features described in the claims or in the embodiments, as well as those that comprise additional other features.

Furthermore, the expression "comprises" and deviations thereof do not exclude other elements or steps. Likewise, the indefinite article "a" or "an" and deviations thereof does not exclude a plurality. The functions of many features explained in the claims may be satisfied by a unit or a step. The terms "essentially", "approximately", "roughly", "virtually" and the like, in combination with a property or a value, define in particular the property exactly or the value exactly. The terms "approximately" and "roughly" in conjunction with a given numeric value or range may relate to a value or range which is positioned within 20%, within 10%, within 5% or within 2% of the given value or range.

LIST OF REFERENCE NUMBERS 1, 1' rotors
2, 2' rotor heads
3, 3' rotor blades
4, 4' upper swash plates
5, 5' lower swash plates
6, 6' servo drives
7, 7' electric motors
8, 8' rotor shafts
9, 9' synchro gear wheels
10 hybrid drive unit
11 combustion engine
12 generator
13 buffer battery
I inclination
S sensor
X horizontal axis

The invention claimed is:

1. An aerial vehicle comprising:
   a hybrid drive unit; and
   a rotor unit,
   wherein the hybrid drive unit comprises a combustion engine, a generator, a first electric motor, and a second electric motor,
   wherein the rotor unit comprises a first rotor, and a second rotor,
   wherein the combustion engine is configured to drive the generator to produce electricity,
   wherein the generator is coupled to the first electric motor such that the first electric motor is feedable with electricity from the generator,
   wherein the generator is coupled to the second electric motor such that the second electric motor is feedable with electricity from the generator,
   wherein the first electric motor is coupled to the first rotor to drive the first rotor,
   wherein the second electric motor is coupled to the second rotor to drive the second rotor,
   wherein a shaft of the first rotor and a shaft of the second rotor are coupled to one another by a coupling unit,
   wherein the coupling unit is a gear unit comprising a first synchro gear wheel being coupled to the shaft of the first rotor and a second synchro gear wheel being coupled to the shaft of the second rotor,
   wherein the first synchro gear wheel directly engages with the second synchro gear wheel,
   wherein the first synchro gear wheel as well as the shaft and rotor blades of the first rotor rotate about a common first rotational axis,
   wherein the second synchro gear wheel as well as the shaft and rotor blades of the second rotor rotate about a common second rotational axis, and
   wherein the first rotational axis and the second rotational axis are inclined with regard to a vertical axis in opposite directions, wherein an inclination of the first and the second rotational axes with regard to the vertical axis is between 5° and 20°.

2. The aerial vehicle according to claim 1, wherein the hybrid drive unit further comprises at least one buffer battery which is coupled
   to the generator to be fed with electricity produced by the generator, and
   to the first electric motor and/or the second electric motor to feed the first electric motor and/or the second electric motor.

3. The aerial vehicle according to claim 1, wherein the first rotor and the second rotor are configured to rotate in opposite directions and to mesh in an interleaved manner.

4. The aerial vehicle according to claim 1, wherein the first rotor and the second rotor are configured to rotate at an angular offset of 90°.

5. The aerial vehicle according to claim 1, wherein the first rotor and the second rotor are inclined with regard to a horizontal axis in opposite directions.

6. The aerial vehicle according to claim 5, wherein an inclination of the rotor blades with regard to the horizontal axis is between 5° and 20°.

7. The aerial vehicle according to claim 1, wherein at least at one of the two rotors a sensor is provided for measuring a rotor speed.

8. The aerial vehicle according to claim 1, wherein the hybrid drive unit is formed as serial hybrid drive.

9. The aerial vehicle according to claim 5, wherein an inclination of the rotor blades with regard to the horizontal axis is between 10° and 15°.

10. The aerial vehicle according to claim 1, wherein an inclination of the first and the second rotational axes with regard to the vertical axis is between 10° and 20° or between 10° and 15°.

11. The aerial vehicle according to claim 1, wherein the rotor unit comprises upper rotating swash plates, and lower non-rotating swash plates.

12. The aerial vehicle according to claim 11, wherein at least one servo drive is arranged at the lower non-rotating swash-plate.

* * * * *